US007685182B2

(12) United States Patent
Dussud (10) Patent No.: US 7,685,182 B2
(45) Date of Patent: Mar. 23, 2010

(54) INTERLEAVED GARBAGE COLLECTIONS (75) Inventor: Patrick H. Dussud, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/800,933

(22) Filed: May 8, 2007

(65) Prior Publication Data

US 2008/0281885 A1 Nov. 13, 2008

(51) Int. Cl.
*G06F 12/00* (2006.01)
(52) U.S. Cl. ............. 707/206; 707/8; 707/201; 707/205; 711/141; 711/151; 711/170; 709/217
(58) Field of Classification Search ............ 707/8, 707/201, 205, 206; 711/147, 170, 171, 173, 711/151, 141; 709/217
See application file for complete search history.

(56) References Cited

U.S. PATENT DOCUMENTS

| | | | |
|---|---|---|---|
| 4,775,932 A | 10/1988 | Oxley et al. | |
| 4,797,810 A * | 1/1989 | McEntee et al. | 707/206 |
| 5,088,036 A | 2/1992 | Ellis et al. | |
| 5,293,614 A | 3/1994 | Ferguson et al. | |
| 5,842,016 A | 11/1998 | Toutonghi et al. | |
| 6,052,699 A * | 4/2000 | Huelsbergen et al. | 707/206 |
| 6,065,020 A | 5/2000 | Dussud | |
| 6,098,089 A | 8/2000 | O'Connor et al. | |
| 6,308,185 B1 * | 10/2001 | Grarup et al. | 707/206 |
| 6,308,319 B1 * | 10/2001 | Bush et al. | 717/141 |
| 6,393,440 B1 | 5/2002 | Salant et al. | |
| 6,490,599 B2 | 12/2002 | Kolodner et al. | |
| 6,502,111 B1 * | 12/2002 | Dussud | 707/206 |
| 6,529,919 B1 * | 3/2003 | Agesen et al. | 707/206 |
| 6,622,226 B1 * | 9/2003 | Dussud | 711/170 |
| 6,804,762 B1 * | 10/2004 | Dussud et al. | 711/170 |
| 6,925,637 B2 * | 8/2005 | Thomas et al. | 717/151 |
| 6,978,285 B2 * | 12/2005 | Li | 707/206 |
| 6,993,770 B1 * | 1/2006 | Detlefs et al. | 719/315 |
| 7,013,454 B2 * | 3/2006 | Bush et al. | 717/124 |
| 7,092,978 B2 * | 8/2006 | Garthwaite | 707/206 |
| 7,096,238 B2 * | 8/2006 | Garthwaite | 707/205 |
| 7,174,354 B2 * | 2/2007 | Andreasson | 707/206 |
| 7,197,521 B2 * | 3/2007 | Subramoney et al. | 707/206 |
| 7,251,671 B2 * | 7/2007 | Wu et al. | 707/206 |
| 7,310,655 B2 * | 12/2007 | Dussud | 707/206 |

(Continued)

OTHER PUBLICATIONS

"Concurrent garbage collection using hardware-assisted profiling"—Timothh H. Heil & James E. Smith—ACM SIGPLAN notices, vol. 36, issue 1 (Jan. 2001) (pp. 80-93).*

(Continued)

*Primary Examiner*—Jean B. Fleurantin
*Assistant Examiner*—Anh Ly
(74) *Attorney, Agent, or Firm*—Krajec Patent Offices, LLC; Russell S. Krajec (57) ABSTRACT

An automated memory management or garbage collection routine uses a first garbage collection routine to perform garbage collection on new objects, and a second garbage collection routine to perform garbage collection on old objects. The two garbage collection routines are operated concurrently, with each routine separately marking objects to be reclaimed. The second routine may operate in a background mode by traversing a tree of objects from a copy of memory, while the first routine may operate on actual memory.

20 Claims, 3 Drawing Sheets

U.S. PATENT DOCUMENTS

| | | | |
|---|---|---|---|
| 7,340,490 B2* | 3/2008 | Teloh et al. | 707/204 |
| 7,389,395 B1* | 6/2008 | Garthwaite et al. | 711/165 |
| 7,428,560 B1* | 9/2008 | Detlefs et al. | 707/206 |
| 7,441,094 B2* | 10/2008 | Stephens | 711/170 |
| 7,490,117 B2* | 2/2009 | Subramoney et al. | 707/206 |
| 7,499,961 B2* | 3/2009 | Detlefs | 707/206 |
| 7,529,786 B2* | 5/2009 | Andreasson | 707/206 |
| 2002/0052926 A1* | 5/2002 | Bush et al. | 709/217 |
| 2003/0069905 A1* | 4/2003 | Dussud | 707/206 |
| 2004/0039758 A1* | 2/2004 | Li | 707/206 |
| 2004/0111448 A1* | 6/2004 | Garthwaite | 707/206 |
| 2004/0162861 A1* | 8/2004 | Detlefs | 707/206 |
| 2004/0167947 A1* | 8/2004 | Garthwaite | 707/206 |
| 2005/0114413 A1* | 5/2005 | Subramoney et al. | 707/206 |
| 2005/0198088 A1* | 9/2005 | Subramoney et al. | 707/206 |
| 2005/0216539 A1* | 9/2005 | Wu et al. | 707/206 |
| 2006/0143421 A1* | 6/2006 | Subramoney et al. | 711/170 |
| 2006/0155791 A1* | 7/2006 | Tene et al. | 707/206 |
| 2007/0022149 A1* | 1/2007 | Bacon et al. | 707/206 |
| 2007/0094671 A1* | 4/2007 | Stephens et al. | 718/105 |
| 2007/0174369 A1* | 7/2007 | Detlefs | 707/206 |

OTHER PUBLICATIONS

Amsaleg et al.—"Efficient Incremental Gargabe Collection for workstation/server database systems"—Institut National De Recherche en Informatique et automatique—Nov. 1994—(pp. 1-39).*

Vechev et al.—"Correctness-preserving derivation of concurrent garbage collection algorithms"—proceedings of the 2006 ACM SIGPLAN conference on Programming Language design and implementation—Canada—ACM—2006 (pp. 341-353).*

Huelsbergen et al.—"Very conncurrent mark-&-Sweep garbage collection without fine-grain synchronization"—ACM SIGPLAN, vol. 34, issue 3, (Mar. 1999) (pp. 166-175).*

* cited by examiner

INTERLEAVED GARBAGE COLLECTIONS

BACKGROUND

Garbage collection is a memory management process for reclaiming unused memory locations within a computer system. When an application no longer accesses or references an object, the memory location allocated to the object may be identified and reclaimed, to be used for other objects.

Garbage collection is a tool that frees a programmer or application developer from having to manually release objects when those objects are no longer needed, which may otherwise consume a significant amount of programmer design effort.

The performance of a system may be affected by the performance of a garbage collection routine. In some instances, a garbage collection routine may cause other applications or threads to pause while a garbage collection operation takes place. In some cases, such pauses may be noticeable and distracting to a user.

When garbage collection operates concurrently with other applications, the more processing and resources a garbage collection routine uses, other applications have fewer resources to perform other tasks.

SUMMARY

An automated memory management or garbage collection routine uses a first garbage collection routine to perform garbage collection on new objects, and a second garbage collection routine to perform garbage collection on old objects. The two garbage collection routines are operated concurrently, with each routine separately marking objects to be reclaimed. The second routine may operate in a background mode by traversing a tree of object references from a copy of memory, while the first routine may operate on actual memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A garbage collection mechanism may have two routines, an ephemeral garbage collection for quickly processing new memory locations, and a concurrent garbage collection for performing a more thorough garbage collection process on the same memory heap. In some instances, the concurrent garbage collection may be performed in the background while the ephemeral garbage collection may be performed in real time.

The two garbage collection routines may use separate marking bits to mark an object for reclamation, while may allow each routine to operate without interfering with the other.

Similarly, the data associated with the concurrent or background garbage collection operation may be treated as memory allocated to a typical program application for the purposes of the ephemeral garbage collection routine. By doing so, the ephemeral garbage collection routine may not interfere with the operation of the other garbage collection routine.

Having two or more simultaneous garbage collection routines operate on a system may enable less severe changes in memory allocation than if either type of garbage collection routine was operated separately or in sequence. Many objects stored in memory are stored for a short period of time. These objects may be typically handled with the ephemeral garbage collection routine. Other objects that have been in memory for a longer period of time often have complex trees of objects that may be traversed to determine if an object is accessible to a function or is inaccessible and may be reclaimed. Such objects may be reclaimed using a background process so that other operations may occur simultaneously with the more time consuming background or concurrent garbage collection process.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, microcode, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
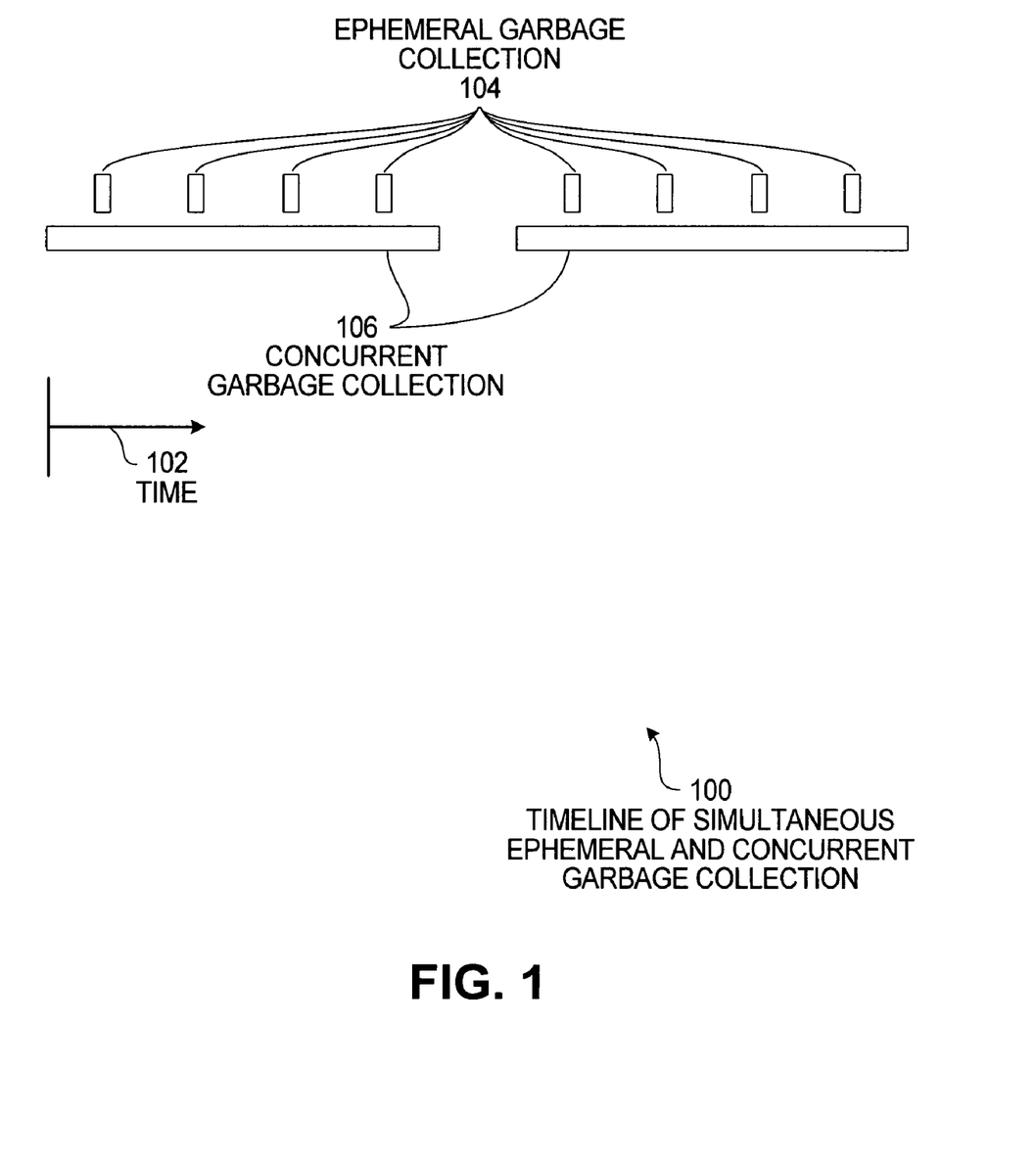
FIG. 1 is a diagram of an embodiment showing a timeline of simultaneous ephemeral and concurrent garbage collection.

FIG. 1 is a diagram of an embodiment 100 showing a timeline of simultaneous ephemeral and concurrent garbage collection. Embodiment 100 illustrates a sequence of parallel operation of two different garbage collection mechanisms that may be operating on a system to perform automated garbage collection and other management functions. A garbage collection mechanism may reclaim memory used by objects that may not be accessed in the future by a computer application or program. Many computer languages or operating environment may use garbage collection as a part of the language specification or environment services to manage memory allocation.

A garbage collection mechanism operates by determining whether a memory object is reachable or not. A reachable object may be an object for which there exists some name in a program or application environment that leads to the object, either directly or through references from other reachable objects.

During garbage collection, a set of root objects may be defined as reachable. Such root objects may include objects that are referenced from anywhere in the call stack and any global variables. The objects in the call stack may include local variables and parameters in the functions currently being invoked in the call stack.

Garbage collection may occur in two different regimes. A first group contains those objects that may be created and discarded quickly during normal program operation. Such objects may be quickly processed with an ephemeral garbage collection routine that may or may not be optimized for quickly processing recent objects.

A second group may be objects that have survived ephemeral garbage collection and may reside in memory for much longer periods of time. The second group of objects may be processed using a background or concurrent garbage collection mechanism, which may take a substantially longer period of time to process than the ephemeral garbage collection.

Embodiment 100 illustrates a timeline 102 that shows ephemeral garbage collection 104 being performed several times during each operation of a concurrent garbage collection 106. The ephemeral garbage collection 104 may be optimized for speed and may be limited to memory management of recently created objects. The concurrent garbage collection 106 may perform a more thorough and detailed examination of older objects that are less likely to change. The concurrent garbage collection 106 may perform garbage collection using object references in memory and may operate in parallel with other processes on a system.

The ephemeral garbage collection 104 may be any type of garbage collection routine and may operate on a subset of objects in memory. In a typical environment, recently created objects may have a high turnover rate and a high amount of memory may be reclaimed with a small amount of garbage collection processing.

In many embodiments, the ephemeral garbage collection 104 may cause other programs to be halted so that garbage collection may be quickly performed on the actual objects in memory so that other programs may not change or mutate an object during the garbage collection process. In such embodiments, a system response may pause during the ephemeral garbage collection.

The concurrent garbage collection 106 may be performed concurrently with other processes in the system, including the ephemeral garbage collection 104. The concurrent garbage collection 106 may operate on actual objects in memory or using a copy of object references in a separate memory location, and may or may not cause a pause of other processes on a system.

As with other applications or programs that are operating, the concurrent garbage collection 106 may create, use, and discard memory objects during its operation. An ephemeral garbage collection routine 104 may treat the concurrent garbage collection 106 as another application within the system so that the ephemeral garbage collection 104 will not interfere with the concurrent garbage collection.

In some instances, an object may be evaluated by both the ephemeral garbage collection 104 and concurrent garbage collection 106. To prevent interference between the two garbage collection routines, some embodiments may use a separate set of flags or indicators may be used for each garbage collection routine. For example, a first set of garbage collection flags, markers, tables, or other mechanism may be used for ephemeral garbage collection while a parallel but independent set of flags, markers, tables, or other mechanism may be used for concurrent garbage collection. Such a system may prevent the two otherwise independent garbage collection mechanisms to operate without interfering with each other.

The garbage collection algorithms used by the ephemeral or concurrent garbage collection may vary widely. In some instances, the ephemeral and concurrent garbage collection routines may be similar algorithms, while in other instances, two different routines may be used.

Figure 2:
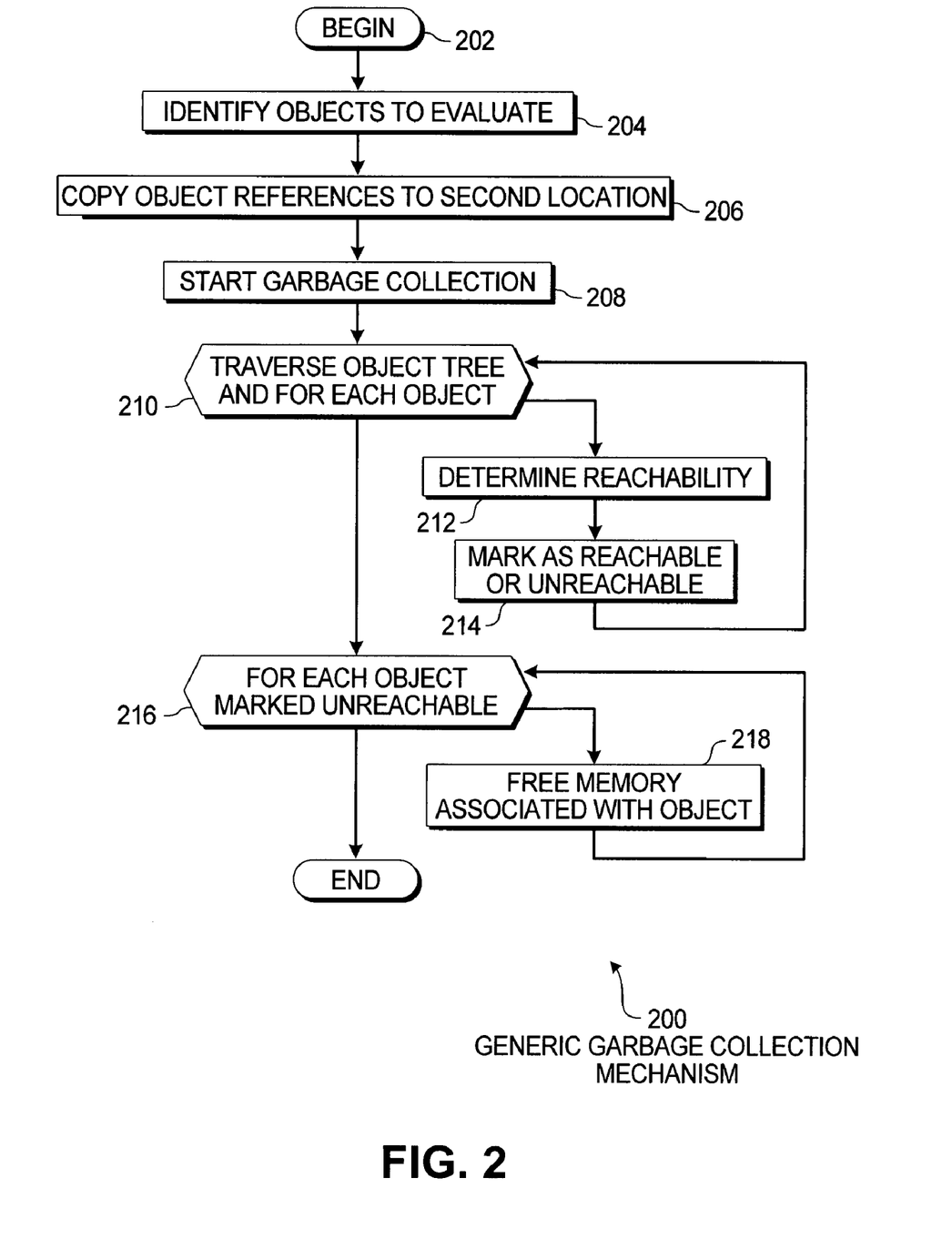
FIG. 2 is a flowchart illustration of an embodiment showing a generic garbage collection mechanism.

FIG. 2 is a flowchart illustration of an embodiment 200 showing a generic garbage collection mechanism. Embodiment 200 illustrates the general flow and procedure for a garbage collection routine, which includes determining whether an object is reachable or unreachable, then removing any unreachable objects.

Many garbage collection algorithms can be quite complex and involve different methods for determining if an object is to be removed. Some algorithms may be very detailed and are designed to capture a very high percentage of unused objects, while other algorithms may be less detailed and are designed to capture a lower percentage of unused objects but use less processor time.

When two or more garbage collection routines are able to operate on a system simultaneously, each routine may be optimized for a particular purpose. For example, an ephemeral garbage collection routine may be optimized for speed while a concurrent garbage collection routine may be optimized for thoroughness with less regard to speed.

The garbage collection process begins in block 202. In many embodiments, a garbage collection routine may be executed when certain limits on the allocation of memory has been met. For example, when a certain amount of memory has been allocated by operating programs or when the amount of free memory falls below a specified level, garbage collection may be started in order to free some of the memory for other operations.

In block 204, objects to evaluate are identified. In some instances, a garbage collection routine may be performed on a specific subset of the objects in memory. For example, an ephemeral garbage collection routine may operate on newly created objects, which may be defined as objects that have been created since the previous execution of the ephemeral garbage collection. In other instances, all objects in memory may be evaluated.

Object references may be copied to a second memory location in block 206. The object references may be generated by crawling or analyzing the call stacks to determine object references that may be evaluated by a garbage collection routine. Some garbage collection routines may operate on a copy of the object references, as opposed to searching the call stacks during garbage collection. A concurrent or background garbage collection routine may operate on object references in a separate memory so that the garbage collection may have less interference with other executing processes. Other garbage collection routines, such as ephemeral garbage collection routines, may not perform the step of copying objects since the garbage collection may be performed on actual objects in the call stacks.

The garbage collection may be started in block 208, and the object tree may be traversed in block 210 and for each object, reachability may be determined in block 212 and the object may be marked as reachable or unreachable in block 214. When an object is reachable, it may be called or used by a function. Unreachable objects are those that may have been discarded and may not be used again. Unreachable objects may be removed from memory.

The object tree may be started with a set of root objects. The root objects may be objects referenced in the call stack and any global variables and may be classified as reachable. From the root objects, other objects referenced from the root objects may be determined by traversing the object tree.

Some garbage collection algorithms use a so-called 'tri-color' algorithm. The basic tri-color algorithm may work as follows: An initial set of white, grey, and black sets may be created and used to maintain progress during the cycle. Initially, the white set or condemned set may be the set of objects that are candidates for having their memory recycled. The black set may be those objects that may be easily proven to have no references to objects in the white set, and the black set may start as empty in some algorithms. The grey set may contain the remaining objects.

A first object may be selected in the grey set and moved to the black set, and all the white objects referenced by the first object are moved to the grey set. This process is repeated until the grey set is empty. When the grey set is empty, the objects remaining in the white set are probably not reachable and may be removed.

An invariant in the tri-color algorithm is that no block object may point directly to a white object.

Different variations of the tri-color algorithm may include moving or non-moving variations. In a moving variation, the reachable objects may be moved to a new area of memory, leaving a contiguous block of memory. Other variations may free memory but may not move the reachable objects.

Some garbage collection routines may operate in an incremental mode. Incremental garbage collections may interleave garbage collection with activity from a running program. Such garbage collection routines may have a mechanism to pause the running program during garbage collection and another mechanism to be notified when a new object is created by the program.

Some garbage collection routines may operate in a concurrent mode where the garbage collection may occur simultaneously and in parallel with running programs or applications. Non-concurrent garbage collection routines may be operated by pausing other executing routines. In some embodiments, a non-concurrent garbage collection routine may pause all other executing routines, while in other embodiments, a subset of executing routines may be paused. For example, a garbage collection routine may pause the execution of a program that created an object which the garbage collection routine is processing, while allowing other programs to operate.

In some embodiments, a portion of garbage collection may be performed in a concurrent mode, while another portion may be performed in a non-concurrent mode. For example, a garbage collection routine may evaluate and mark objects in a concurrent mode but may disposition the marked objects by moving, deleting, or otherwise processing the objects in a non-concurrent mode.

Any mechanism or algorithm may be used to determine reachability and process a reachable or unreachable object.

Objects may be marked in block 214 in several different manners. In some embodiments, a bit or set of bits may be used to flag an object as reachable or unreachable, while in other embodiments, an object may be moved to a different memory location if it is reachable. In some embodiments, a table of objects may be created that contains reachable or unreachable identifiers for each object in the table.

When two or more garbage collection routines are operating on an overlapping set of objects, a separate set of marker bits or other mechanism may be used by each garbage collection routine. Because the marking mechanisms may be separate, interference of one garbage collection routine with another may be avoided.

For each unreachable object in block 216, the memory associated with the object is freed in block 218. In some instances, memory may be freed by moving a reachable object to another location, leaving a contiguous block of memory that is free. In other instances, memory may be freed by deallocating the memory associated with the object.

Figure 3:
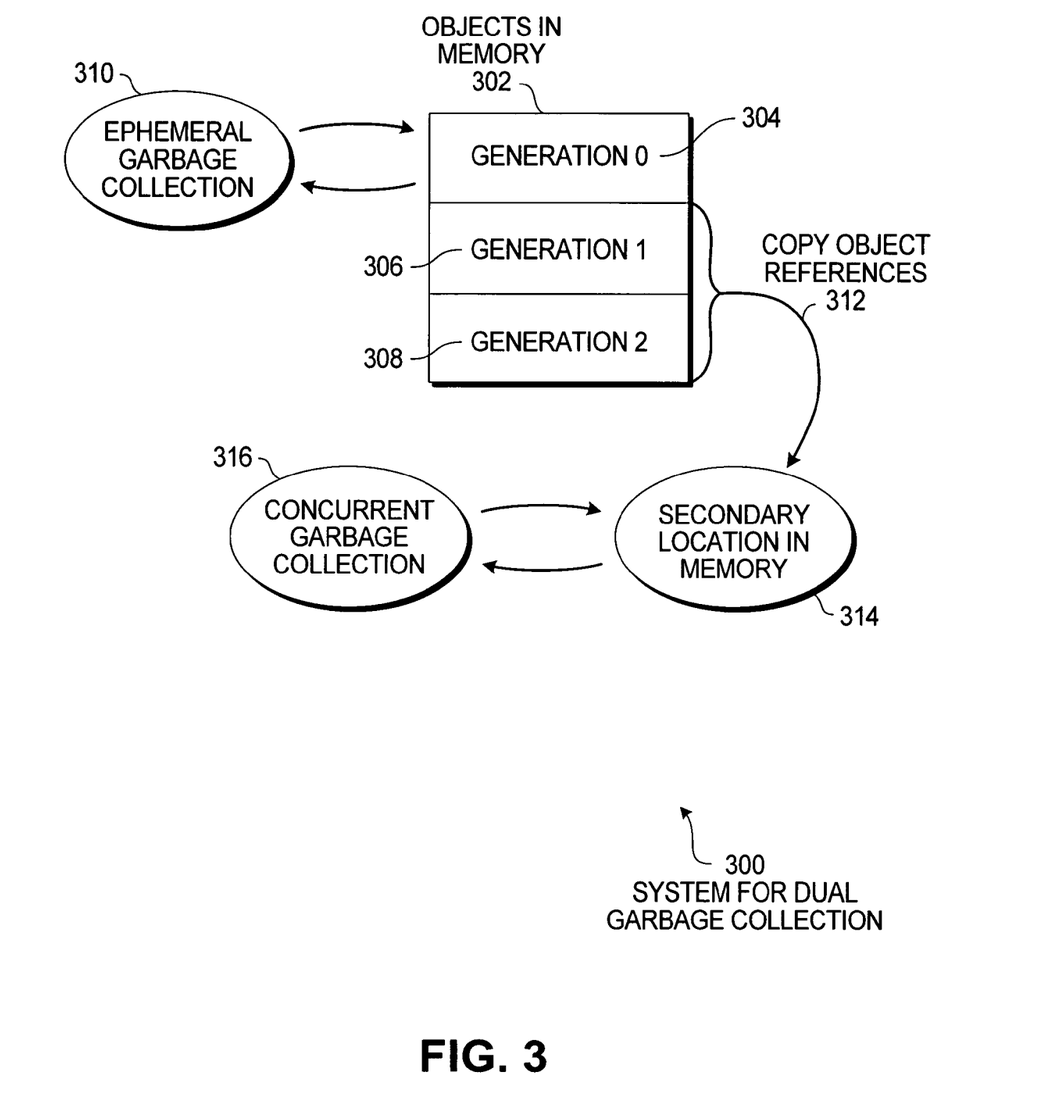
FIG. 3 is a diagram of an embodiment showing a system with dual garbage collection mechanisms.

FIG. 3 is a diagram of an embodiment 300 showing a system for dual garbage collection. Embodiment 300 illustrates a system where two garbage collection routines operate on two different and non-overlapping sets of memory objects. The memory objects 302 are grouped into three generations, Generation 0 in block 304, Generation 1 in block 306, and Generation 2 in block 308.

In many systems, the more recently created objects then to become unreachable with a higher frequency than older objects. Thus, a quick ephemeral garbage collection routine 310 may operate on those objects of Generation 0 in block 304.

In some instances, a garbage collection routine may be performed with all other processes in a system paused. Many ephemeral garbage collection routines may operate in this manner. In order to minimize the amount of time that other processes are paused, the ephemeral garbage collection may be performed on a subset of data. The subset of data is generally the objects that have been created since the last operation of the ephemeral garbage collection routine. By operating on the objects in block 304 of Generation 0, the ephemeral garbage collection routine may efficiently free up memory without unnecessarily long pauses in system performance.

Each generation of objects may refer to the objects created since an ephemeral garbage collection. For example, Generation 1 in block 306 may be those objects that have been analyzed by the ephemeral garbage collection routine 310 and were determined reachable. Generation 2 objects in block 308 may be those objects that have been analyzed two or more times by a garbage collection routine.

In some embodiments, an ephemeral garbage collection routine 310 may operate on Generation 0 and Generation 1 objects in blocks 304 and 306 while the concurrent garbage collection 314 may operate on Generation 2 objects in block 308. Other embodiments may separate the objects in memory 302 into different classifications and allocate all or a subset of the objects to one garbage collection routine and all or another subset of the objects to another garbage collection routine. The specific subsets selected for each routine may be predetermined or may be changed using an adaptive routine or other mechanism to allocate objects to a specific garbage collection routine.

In other embodiments, different numbers of generations of objects may be tracked and evaluated using various garbage collection routines. For example, some embodiments may track four, five, or more generations of objects. In some such embodiments, ephemeral garbage collection may be performed on one or more of the youngest generations while concurrent garbage collection may be performed on later generations. For example, an ephemeral garbage collection routine may operate on the four youngest generations of objects and a concurrent garbage collection routine may operate on the oldest generation of objects.

In still other embodiments, three or more different garbage collection routines may be used to analyze different generations of objects. For example, some such embodiments may use one type of garbage collection for Generation 0, a different type of garbage collection for Generations 1 and 2, and a third type of garbage collection for older generations.

In embodiment 300, object references from Generation 1 in block 306 and Generation 2 in block 308 may be copied 312 to a secondary location in memory 314. An object reference generator may traverse the call stacks to determine object references that may be used by a concurrent garbage collection routine 314. The concurrent garbage collection routine 316 may perform garbage collection using the copied object references. By using copied object references, the concurrent garbage collection routine 316 may perform its operation without repeatedly traversing the call stacks. Other embodiments may operate directly on the call stacks and not use a copy of the object references.

For the purposes of this specification and claims, a concurrent garbage collection routine may defined as one which may operate in parallel with other operations on a computer system. In some embodiments, a concurrent garbage collection routine may use complex locking mechanisms to perform garbage collection operations on actual memory objects. In the present embodiment, a garbage collection routine may be performed using two different sets of markers in order to avoid interference. Additionally, the concurrent garbage collection routine may be paused while the ephemeral garbage collection routine operates to avoid interference. Other concurrent garbage collection routines may use different architectures, algorithms, or mechanisms to operate in parallel with other system functions and other garbage collection routines.

For the purposes of this specification and claims, an ephemeral garbage collection routine may be defined as one which may operate faster than and simultaneously or in parallel with the concurrent garbage collection. Some ephemeral garbage collection routines may operate by pausing other functions of a system, while others may not. Some ephemeral garbage collection routines may operate on a subset of memory objects, while others may not.

When a concurrent garbage collection routine is operating during an ephemeral garbage collection operation, the concurrent garbage collection routine may create objects in memory in the course of normal operation. Such objects may be treated similarly to other objects created by applications and other programs executing on the system. Ephemeral garbage collection may perform garbage collection on objects created by the concurrent garbage collection as it would other programs or applications being executed. By treating the concurrent garbage collection routine as another program or application, the ephemeral garbage collection routine may not interfere with the operation of an ongoing concurrent garbage collection routine. Similarly, the ephemeral garbage collection routine may be treated like the effects of a program thread by the concurrent garbage collection routine.

The ephemeral garbage collection 310 and the concurrent garbage collection 316 may separately evaluate and mark various objects in memory as reachable or unreachable. Each garbage collection routine may use a separate set of markers or mechanisms for marking an object as reachable or unreachable. In some embodiments, separate markers may enable two or more garbage collection routines to operate without interference with each other.

When an ephemeral garbage collection 310 and concurrent garbage collection 316 are evaluating the same object, the concurrent garbage collection 316 may be paused to enable the ephemeral garbage collection 310 to move the object, if the ephemeral garbage collection 310 uses a moving algorithm.

When two garbage collection routines operate on the same object, one garbage collection routine may detect a setting by another garbage collection routine and use the information as a shortcut without having to perform further analysis. For example, if a first garbage collection routine is known to be more exact or thorough than a second garbage collection routine, the second garbage collection routine may detect that the first routine definitively determined that an object is unreachable. Rather than further analyzing the object, the second routine may make the object as unreachable and move to another object.

Throughout this specification, an illustration of two garbage collection routines has been given to highlight various mechanisms of operating garbage collection routines concurrently. However, such concepts may be extended to three, four, or more different garbage collection routines that may be operated in parallel. Such garbage collection routines may be similar or different in function, operation, thoroughness, speed, or overall algorithm. The example of two garbage collection routines was selected for simplicity but is not meant to be limiting in any fashion.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
performing a first garbage collection operation comprising:
evaluating a first set of objects, said first set of objects having not been previously evaluated by said first garbage collection operation;
marking each of said objects as either reachable or unreachable using a first marker; and
reclaiming said objects as marked from memory as unreachable;
said first garbage collection operation being an incremental garbage collection operation;
performing a second garbage collection operation concurrently with said first garbage collection operation, said second garbage collection operation comprising:
evaluating a second set of objects;
marking each of said objects as either reachable or unreachable using a second marker, said second marker being different from said first marker; and
reclaiming said objects as marked from memory as unreachable.

2. The method of claim 1, said second garbage collection operation further comprising:
pausing said second garbage collection operation when said first garbage collection operation is operating.

3. The method of claim 1, said second set of objects comprising said first set of objects.

4. The method of claim 1, said second garbage collection operation comprising:
storing object references in a block of memory; and
wherein said second set of objects are evaluated using said object reference.

5. The method of claim 1, said first garbage collection operation being performed as a non-concurrent operation.

6. The method of claim 5, said first garbage collection operation being performed as a non-concurrent operation with respect to an application that created said first set of objects.

7. The method of claim 1, said first garbage collection operation being performed concurrently with an application that created said first set of objects.

8. The method of claim 1, said first garbage collection operation being performed in an incremental mode.

9. The method of claim 1, said reclaiming by said second garbage collection being performed as a non-concurrent operation.

10. The method of claim 1, said reclaiming by said second garbage collection operation being performed in an incremental mode.

11. A computer readable storage medium comprising computer executable instructions adapted to perform the method of claim 1.

12. A system comprising:
a set of memory locations within a computer system;
a first garbage collection mechanism adapted to:
evaluate a first set of objects stored in said memory locations, said first set of objects having not been previously evaluated by said first garbage collection operation;
mark each of said objects as either reachable or unreachable using a first marker; and
reclaim said objects as marked from memory as unreachable;
said first garbage collection mechanism being an incremental garbage collection mechanism;
a second garbage collection mechanism adapted to:
operate concurrently with said first garbage collection mechanism;
evaluate a second set of objects stored in said memory locations;
mark each of said objects as either reachable or unreachable using a second marker, said second marker being different from said first marker; and
reclaim said objects from said memory locations as marked from memory as unreachable.

13. The system of claim 12, said second garbage collection mechanism further adapted to:
pause said second garbage collection operation when said first garbage collection operation is operating.

14. The system of claim 12, said second set of objects comprising said first set of objects.

15. The system of claim 12, said second garbage collection mechanism further adapted to:
store object references in a block of memory; and
wherein said second set of objects are evaluated using said object references.

16. The system of claim 12, said first garbage collection mechanism being operated as a non-concurrent operation.

17. The system of claim 16, said first garbage collection mechanism being operated as a non-concurrent operation with respect to an application that created said first set of objects.

18. The system of claim 12, said first garbage collection mechanism being operated concurrently with an application that created said first set of objects.

19. A method comprising:
performing a first garbage collection operation comprising:
evaluating a first set of objects, said first set of objects having not been previously evaluated by said first garbage collection operation;
marking each of said objects as either reachable or unreachable using a first marker; and
reclaiming said objects as marked from memory as unreachable;
said first garbage collection operation being an incremental garbage collection operation;
performing a second garbage collection operation concurrently with said first garbage collection operation, said second garbage collection operation comprising:
storing object references for a second set of objects in a first memory location;

evaluating said second set of objects using said first memory location;

marking each of said objects as either reachable or unreachable using a second marker, said second marker being different from said first marker;

reclaiming said objects as marked from memory as unreachable; and pausing said second garbage collection operation when said first garbage collection operation is being performed.

20. A computer readable storage medium comprising computer executable instructions adapted to perform the method of claim 19.

* * * * *